(12) United States Patent
Fujiwara et al.

(10) Patent No.: US 6,186,264 B1
(45) Date of Patent: Feb. 13, 2001

(54) MOTOR CAR

(75) Inventors: Masakatsu Fujiwara, Kasai; Yasuo Hirose; Yukifumi Yamaguchi, both of Himeji, all of (JP)

(73) Assignee: Sanyo Electric Co., Ltd., Osaka-fu (JP)

( * ) Notice: Under 35 U.S.C. 154(b), the term of this patent shall be extended for 0 days.

(21) Appl. No.: 09/086,410

(22) Filed: May 29, 1998

(30) Foreign Application Priority Data

May 29, 1997 (JP) .................................................. 9-140090

(51) Int. Cl.[7] .................................................. B60K 17/06
(52) U.S. Cl. .......................................... 180/369; 180/205
(58) Field of Search ................................. 180/369, 205, 180/206, 207, 338, 340, 368; 142/45, 70

(56) References Cited

U.S. PATENT DOCUMENTS

| | | | |
|---|---|---|---|
| 2,689,012 | * 9/1954 | Jaulmes | 180/205 |
| 3,737,000 | * 6/1973 | Knobloch et al. | 180/369 |
| 4,140,195 | * 2/1979 | Watanabe et al. | 180/205 |
| 5,361,863 | * 11/1994 | Goodwin | 180/205 |
| 5,749,429 | * 5/1998 | Yamauchi et al. | 180/205 |
| 5,857,537 | * 1/1999 | Matsumoto et al. | 180/205 |
| 5,984,038 | * 11/1999 | Fujiwara et al. | 180/205 |

FOREIGN PATENT DOCUMENTS

| | | |
|---|---|---|
| 27 43 649 | 4/1978 | (DE) . |
| 7-95744 | 4/1995 | (JP) . |
| 7-117779 | 5/1995 | (JP) . |
| 8-244673 | 9/1996 | (JP) . |
| 9-95292 | 4/1997 | (JP) . |
| 9-169290 | 6/1997 | (JP) . |

* cited by examiner

Primary Examiner—Brian L. Johnson
Assistant Examiner—M B Klebe
(74) Attorney, Agent, or Firm—Sughrue, Mion, Zinn, Macpeak & Seas, PLLC (57) ABSTRACT

A motor-assisted bicycle powered by both a motor and man power with a transmission reduction mechanism for transmitting the rotation of a motor as well as for reducing speed. The motor-assisted bicycle also has a driving wheel capable of being driven by a driving force delivered from the transmission reduction mechanism and a clutch for transmitting a one-way driving force. The clutch is provided within the transmission reduction mechanism, thereby making the entire driving portion of the motor-assisted bicycle more compact.

12 Claims, 9 Drawing Sheets

MOTOR CAR

BACKGROUND OF THE INVENTION

The present invention relates to a motor-assisted bicycle that transmits driving force from a motor or the like so as to run with the driving force as a driving source.

Conventionally a motor-assisted bicycle of this type, as described in Japanese Unexamined Patent Publication No. 58568/1997 (B62M23/02), is designed to have a pulley provided on an output shaft of a motor, rotate the next pulley through a belt engaged on the pulley, and couple the pulley to a gear formed on an inner periphery of a rotational casing so as to transmit driving force. By provision of a one-way clutch in the pulley, the rotation by the motor driving force can be cut off, when the rotation speed of a wheel becomes faster than the rotation by the motor driving force, so that the motor driving force does not become the load of rotation of the wheel with making the rotation of the wheel preferential.

A tension pulley is provided in the middle portion of a belt to adjust the tension of the belt, so that the loss in transmission of the driving force is reduced by pressing the belt with the tension pulley.

However, this configuration has problems in that the entire casing cannot be made smaller, even if an attempt is made to make it lighter in weight and more compact in shape due to the increased number of the pulleys, and that the number of components increases because the one-way clutch has to be provided as a separate item in addition to the pulley, which takes more time in the assembly operation and increases the cost.

Since the tension pulley has to be used, the casing becomes larger. Further, the number of components is increased, whereby the assembly time is increased and the cost becomes higher.

The present invention was made in view of the above drawbacks, and an object of the invention is to provide a motor-assisted bicycle which is lighter in weight, more compact in shape, has a reduced number of components, and is easier to assemble.

SUMMARY OF THE INVENTION

The motor-assisted bicycle of the present invention comprises a transmission reduction mechanism for transmitting the rotation of a motor and reducing speed, a driving wheel to be driven by a driving force from the transmission reduction mechanism, and a clutch for transmitting only one-way driving force, the clutch being provided to the transmission reduction mechanism.

The transmission reduction mechanism comprises an epicyclic roller reduction mechanism having a plurality of rollers, at least one of the rollers being made different in outer diameter from the other rollers, and a center of at least one of the rollers not being supported with a shaft.

A rotary cylinder to be rotated in inner contact with the outer periphery of the rollers is provided, and the roller not supported with the shaft is in inner contact between a rotary shaft and the rotary cylinder with respect to one-way rotation of the rotary shaft.

The motor-assisted bicycle of the present invention has a transmission reduction mechanism comprising rollers coupled to the rotary shaft, and an output mechanism having an output shaft coupled to a portion except for the coupled portion between the roller and the rotary shaft, and is characterised in that the output shaft is made eccentric around the rotary shaft, and a fixing member for fixing the position of the output mechanism is provided.

The roller comprises a plurality of rollers positioned in contact with the rotary shaft, and the output mechanism, formed to be a cylinder having a bottom, is positioned to allow an outer surface of the roller contact an inner surface of the output mechanism.

The output shaft has a pulley for provision of a ring-shaped transmission member.

The output mechanism is composed of a rotary cylinder to be coupled to the roller, and a cover for covering the rotary cylinder and to be fixed by the fixing member.

The motor-assisted bicycle of the present invention includes a motor driving portion for rotating a driving wheel with the motor as a driving source, and a man power driving portion for rotating the driving wheel with man power as a driving source, and is characterised in that the transmission reduction mechanism is interposed between the motor and the driving wheel.

A hub of the driving wheel comprises a rotational casing rotated by the driving of the motor, and a fixed casing to be fixed oppositely to the rotational casing, and the motor and the transmission reduction mechanism is housed in the hub.

According to the configuration of the present invention, when a rotary shaft of a motor is rotated with an output shaft being in a stop condition, rotation of the rotary shaft is reduced in speed by a transmission reduction mechanism so as to rotate the output shaft. When the rotation of the output shaft is faster than the rotation speed of the rotary shaft, however, the driving force is cut off by a clutch means provided between the output shaft and the rotation shaft with the motor being driven continuously, and the output shaft is rotated with the driving force not reaching the rotary cylinder. In the case where the driving transmission apparatus is used for the motor-assisted bicycle, when the motor is rotated faster than the rotation of the driving wheel, the apparatus is so operated as to transmit power by a one-way clutch, thereby rotation of the rotary shaft is reduced to rotate the output shaft. When the rotation of the motor is slower than the rotation of the driving wheel, power is cut off by a clutch means provided between the output shaft and the rotary shaft so that the motor does not become a burden upon the rotation of the driving wheel.

When the rotary shaft is rotated by the driving of a motor, a roller not supported by the shaft starts its rotation with the driving force. All the rollers begin rotation by receiving power of the rotary shaft with the other rollers being in pressure contact with the rotary shaft. An output shaft of an epicyclic roller reduction mechanism starts its rotation by rotation of all the rollers. When the rotation speed of the rotary shaft is slower than the rotation speed of the output shaft, the roller not supported with the shaft cuts off pressure contact against the rotary shaft, so that pressure contact against the rotary shaft of the other rollers is eliminated, and the output shaft is rotated without receiving the driving force from the rotary shaft. When rotation of a driving wheel is slower than rotation of a motor in the case where the driving transmission apparatus is used for a motor-assisted bicycle, the driving force from the rotary shaft of the motor is reduced by the transmission reduction mechanism and is outputted to the output shaft. When rotation of the driving wheel is faster than rotation of the motor, a roller not supported by the shaft moves in the epicyclic roller reduction mechanism so as to cut off transmission of the driving force, so that the load of the motor is not applied upon rotation of the driving wheel.

In a motor-assisted bicycle including a motor driving portion and a man power driving portion, a driving force of the motor is transmitted by a clutch when the rotation speed of a rotary shaft of the motor is faster than the rotation speed of a driving wheel. When the rotation speed of the driving wheel is faster than the rotation speed of the rotary wheel of the motor, the driving force of the motor is not transmitted to the driving wheel by the clutch so that the load would not be applied upon rotation of the driving wheel. Such a condition is caused when the motor-assisted bicycle runs on a downward path with inertia or when the man power becomes larger than the motor force.

When an assembly operation is conducted in accordance with the present invention, a roller is coupled to a rotary shaft which is a driving source. To adjust the coupling between an output shaft and a member to be coupled to the output shaft, an output mechanism is made eccentric around the rotary shaft of an input mechanism, and is fixed with a fixing member while changing the position of the output shaft, to a position where the output shaft and the coupling member properly engage with each other. When a member coupled to the output shaft is a belt, a chain or the like, the output mechanism is rotated around the input shaft and is fixed with a fixing member in a location properly pulled, thereby the power transmission apparatus functions as a tension pulley.

The output mechanism rotates an output shaft through reduction by a plurality of rotary bodies, and thus acts as a reducing machine.

Since at least one of the pluarity of rollers has an outer diameter different from those of the other rollers, the positions of the rotary shaft and output shaft can be made eccentric easily.

In order to transmit the driving force, ring-shaped transmission members such as a chain and a belt are provided on a pulley provided on an output shaft, and a driving transmission apparatus can play a role as a tension pulley.

In the output mechanism, the position of the output shaft can be fixed by moving a cover and fixing the position with a fixing member. The rotation of the roller is transmitted to the rotary cylinder in the cover so as to rotate the output shaft. Since the rotary cylinder for transmitting the power is covered, the cover would not be rotated, thereby ensuring safety. Furthermore, the position of the output shaft can be easily fixed.

DETAILED DESCRIPTION

The embodiments of the present invention will be described hereinafter by way of an example of a driving portion of a motor-assisting bicycle with a supplementary power, with reference to the attached drawings.

Figure 8:
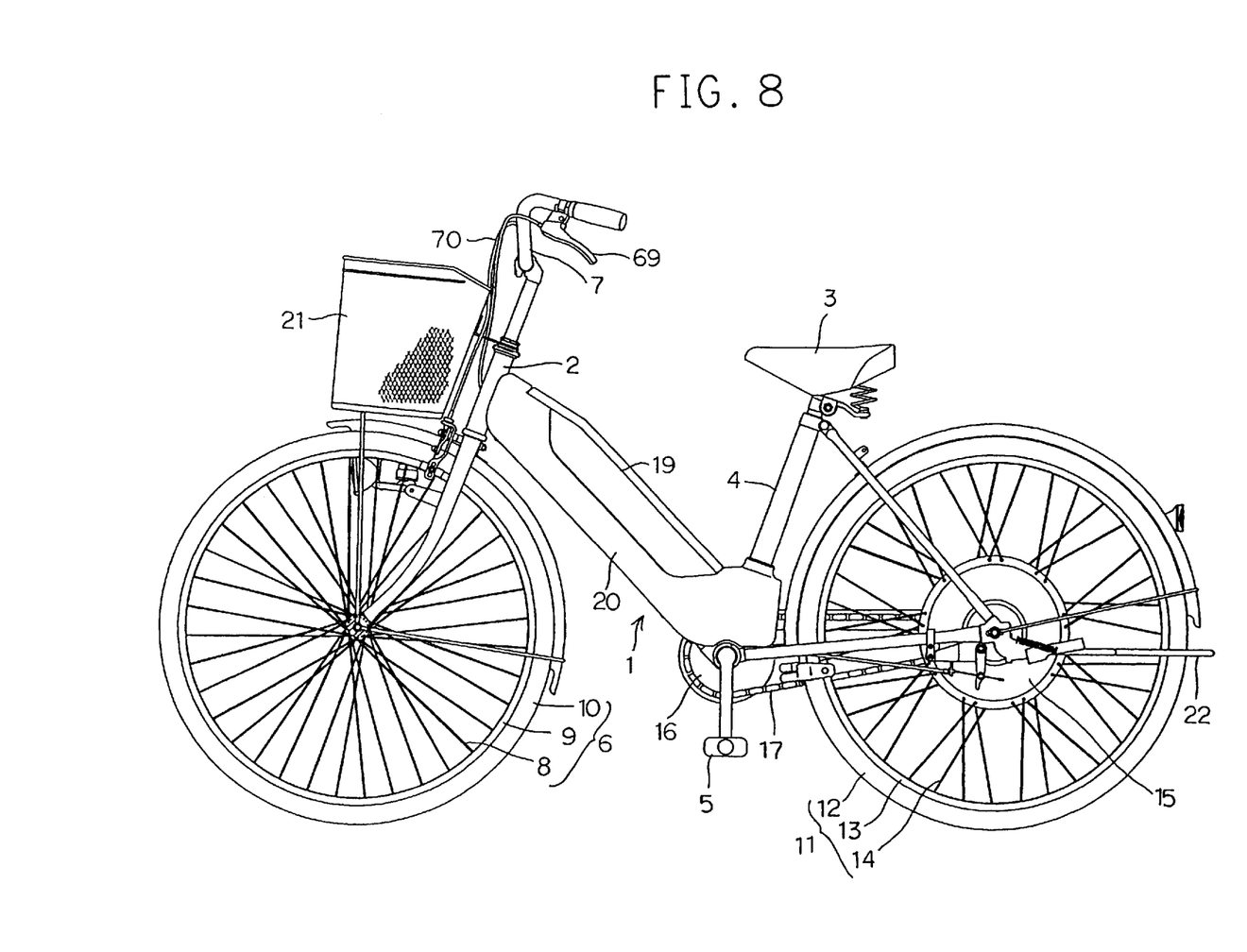
FIG. 8 is a side view showing the entire configuration of a motor-assisted bicycle according to an embodiment of the present invention.

The constitution of the entire motor-assisted bicycle will be first described based on FIG. 8.

Numeral 1 is a main frame for coupling a head pipe 2 provided on the front portion to a seat tube 4 provided below a saddle 3. A pedal 5 which can be rotated by man power is mounted on a portion for coupling the main frame 1 to the seat tube 4.

Numeral 6 is a front wheel which moves with a handle 7 and decides a running direction by operation of the handle 7. The front wheel 6 is comprised of spokes 8, a rim 9 and a tire 10.

Numeral 11 is a rear wheel which functions as a driving wheel. The rear wheel 11 is also composed of a tire 12, a rim 13 and spokes 14, and has a driving portion 15 for driving the rear wheel 11.

Numeral 16 is a front sprocket to be rotated together with rotation of the pedal 5. A chain 17 is engaged with the front sprocket 16. The rotation of the sprocket 16 is designed to be transmitted to a rear sprocket 36 (described later) on the wheel shaft 18 of the driving portion 15.

Numeral 19 is a battery which becomes a power source of a motor 55 to be described later. A nickel-cadmium battery of, for example, 24 volts is accommodated therein. The battery 19 is detachable and a charging operation can be effected indoors. Numeral 20 is a mounting stand for mounting thereon the battery 19, which is attached to the main frame 1 to surround the same.

Numeral 21 is a front cage, and numeral 22 is a stand for supporting a bicycle in a parking operation.

Figure 4:
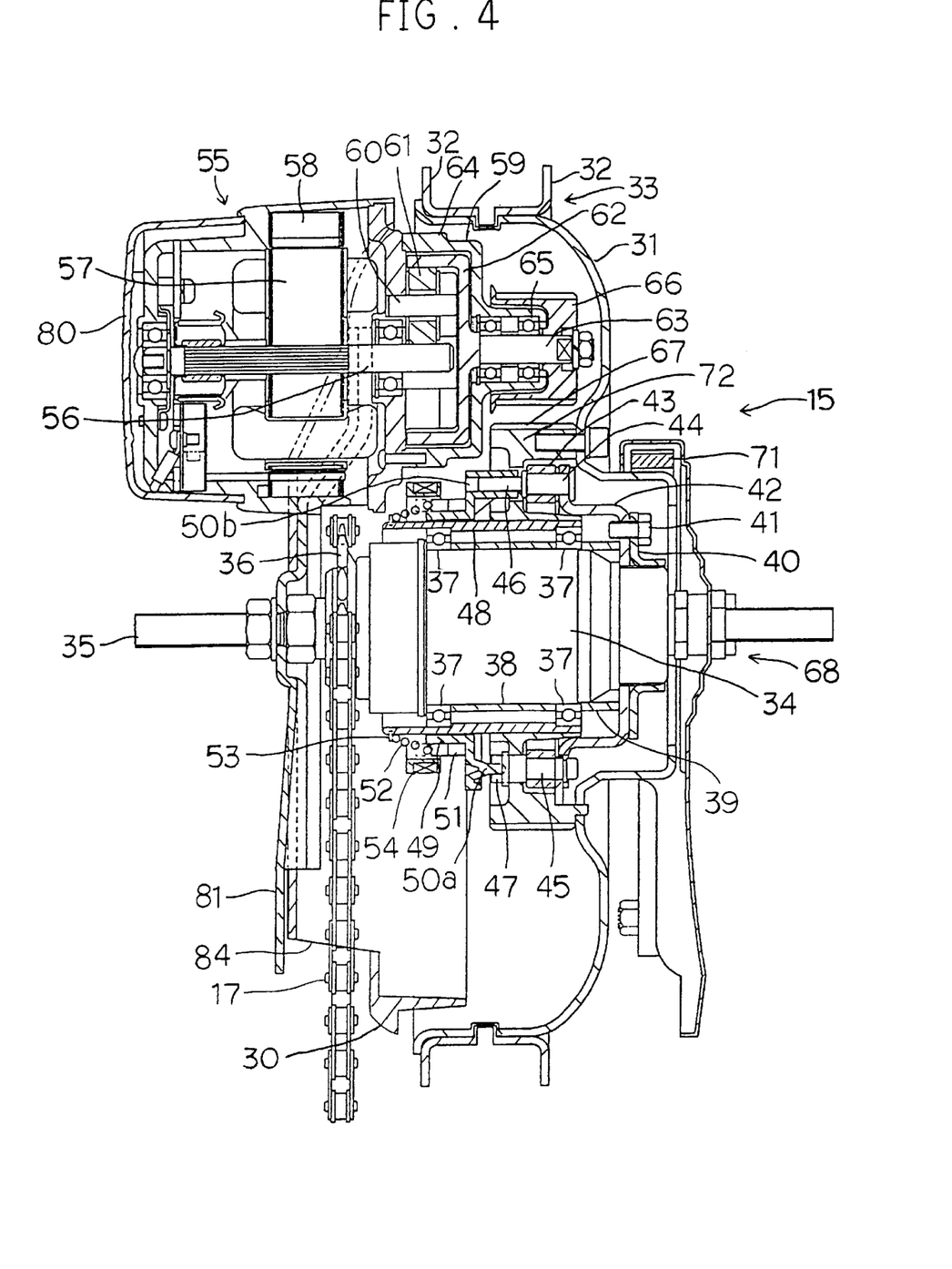
FIG. 4 is a side sectional view of a driving portion according to an embodiment of the present invention.

A concrete configuration of the above described driving portion 15 will be described based on FIG. 4.

Numeral 30 is a disk-shaped fixed casing made of resin mounted fixedly on the main frame 1, and numeral 31 is a rotational casing for coaxially rotating outside of the fixed casing 30. A hub is composed of the fixed casing 30 and the rotational casing 31. A frame body 33 comprising two ring-shaped ribs 32 is provided on the outer periphery of the rotational casing 31, and a plurality of spokes 14 extend from the ring-shaped rib 32 of the frame body 33 to a rim 13 on which the tire 12 is mounted. The fixed casing 30 is slightly open in a portion corresponding to the rear sprocket 36 to be described later, and a fixed casing 30 is provided to enclose the outer periphery of the rear sprocket 36 in a view seen from the side.

Numeral 34 is a change gear, of a hub built-in type, provided on an axle 35. The change gear 34 is connected with a rear sprocket 36 through a ratchet (not shown). Namely, the input from the chain 17 is adapted to be applied in one direction only by the ratchet so that the driving force is cut off when the force is applied in a reversed rotational direction.

Numeral 37 denotes two bearings engaged with the outer periphery of the change gear 34. Between the bearings 37 is inserted a cylindrical container 38 so that a predetermined space can be provided on the outer periphery of the change gear 34.

In order to retain the position of one of the bearings 37, the second cylindrical container 39 is engaged therewith.

Numeral 40 is a collar comprising a metal cylinder and a flange portion extending radially and outwardly from an end face of the cylinder. The flange portion of the collar 40 which comes into contact with the change gear 34 is threaded so as to engage with a bolt 41 provided on one side of the change gear 34.

Numeral 42 is an extended collar portion which is fixed with a bolt 41 of the collar 40 and has a cylindrical portion formed on the inner side of the collar 40. The extended collar 42 comes into contact with the second container 39 through tightening of the collar 40 with the bolt, and is retained on one side of the bearing 37 with keeping a space equal to the height of the second container 39. The extended collar 42 is rotated together with the rotation of the outer periphery of the change gear 34. One end of a ring-shaped washer spring 43 having a spring property is retained by a pin 44 in one portion of the extended collar 42, while the other end of the washer spring 43 is retained by a pin 45 on the final stage pulley 72 fixed to the rotational casing 31. A cylindrical extended portion 46 is formed on the pin 44 for retaining one end of the washer spring 43, and an inclining portion 47 is formed on the final stage pulley 72 on the chain 17 side.

Numeral 48 is a cylindrical outer container provided fixedly between the outer periphery of the bearing 37 provided on the container 38, and the final stage pulley 72. The outer container 48 is rotated together with rotation of the final stage pulley 72. The outer container 48 is rotated in the same direction as that of the container 38 with a slide corresponding to distortion due to distortion by washer spring 43.

Numeral 49 is a sliding member provided on the outer periphery of the outer container 48 to be slidable in a direction of the axle 35. A convex portion 50a which projects towards the final stage pulley 72 and comes into contact with the inclining portion 47 is formed on the sliding member 49. A concave portion 50b to be engaged with the extended portion 46 is also formed on the sliding member 49. On the sliding member 49 is provided an aluminum ring 51 made of a conductive material. When the convex portion 50 comes into contact with the inclining portion 47 and the inclining portion 47 moves in a rotational direction, the sliding member 49 slides in a spiral manner to move the ring 51 in the direction of the axle 35. A spring 52 is provided to the sliding member 49 so that it is normally urged to the right side shown in FIG. 5 by the spring 52. The other end of the spring 52 is retained by a stopper 53 provided to the outer container 48.

Numeral 54 is a coil provided near a portion of the fixed casing 30 where the ring 51 slides, which can convert inductance change caused by movement of the ring 51 into electric signals. Namely, man power torque of the man power driving force can be converted into electric signals.

Numeral 55 is a motor, which is a supplementary power of a car, provided in the fixed casing 30. The motor 55 is driven based on an output signal from a control substrate 82 described later, and comprises a rotor 57 having a rotary shaft 56, and a stator 58 provided around the rotor 57.

Numeral 59 is an epicyclic roller reduction mechanism coupled to the rotary shaft 56 and operative to reduce the rotation of the motor 55. The epicyclic roller reduction mechanism 59 is composed of a plurality of rollers 61 provided rotatably around a pin 60 fixedly projected from the motor 55, the rollers being in contact with the rotary shaft 56 of the motor 55 to rotate by rotation of the rotary shaft 56; a rotary cylinder 62 in contact with the outer periphery of the plurality of rollers 61 to rotate by rotation of the rollers 61; and an output shaft 63 integrally formed with the rotary cylinder 62 to project therefrom. Numeral 64 is a cover of the epicyclic mechanism 59 fixed to the motor 55 through the output shaft 63 and the bearing 65. The rotary shaft 56 of the motor 55 and the output shaft 63 of the epicyclic roller reduction mechanism 59 are positioned eccentrically. The rotary cylinder 62 and the cover 64 are called an output mechanism. The driving force is transmitted by the rotary cylinder 62.

Numeral 66 is a pulley fixed to the output shaft 63 of the epicyclic roller reduction mechanism 59. A belt 67 is engaged with the pulley 66 and the final stage pulley 72 so that the driving force from the motor 55 can be transmitted.

Figure 2:
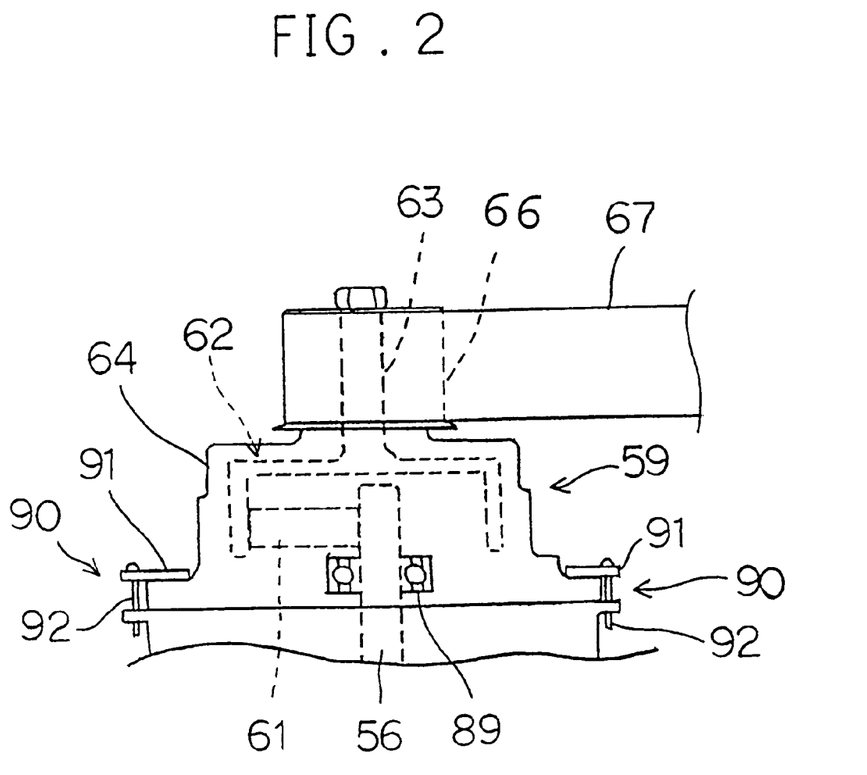
FIG. 2 is a plan view of a fixed casing according to an embodiment of the present invention.

The configuration of the epicyclic roller reduction mechanism 59, pulley 72, and rotary shaft 56 of the motor 55 is described later based on FIG. 2.

Numeral 68 is a band brake which is provided to partially cover the outer wall of the rotational casing 31 and for controlling rotation of the rotational casing 31. The band brake 68 moves the brake shoe 71 inwardly by pulling the wire 70 when the band brake is operated with a brake lever 69 provided to the handle 7. The brake shoe 71 and the rotational casing 31 come into contact with each other so that the braking operation can be applied upon the rotational casing 31, i.e., the rear wheel 11.

Figure 6:
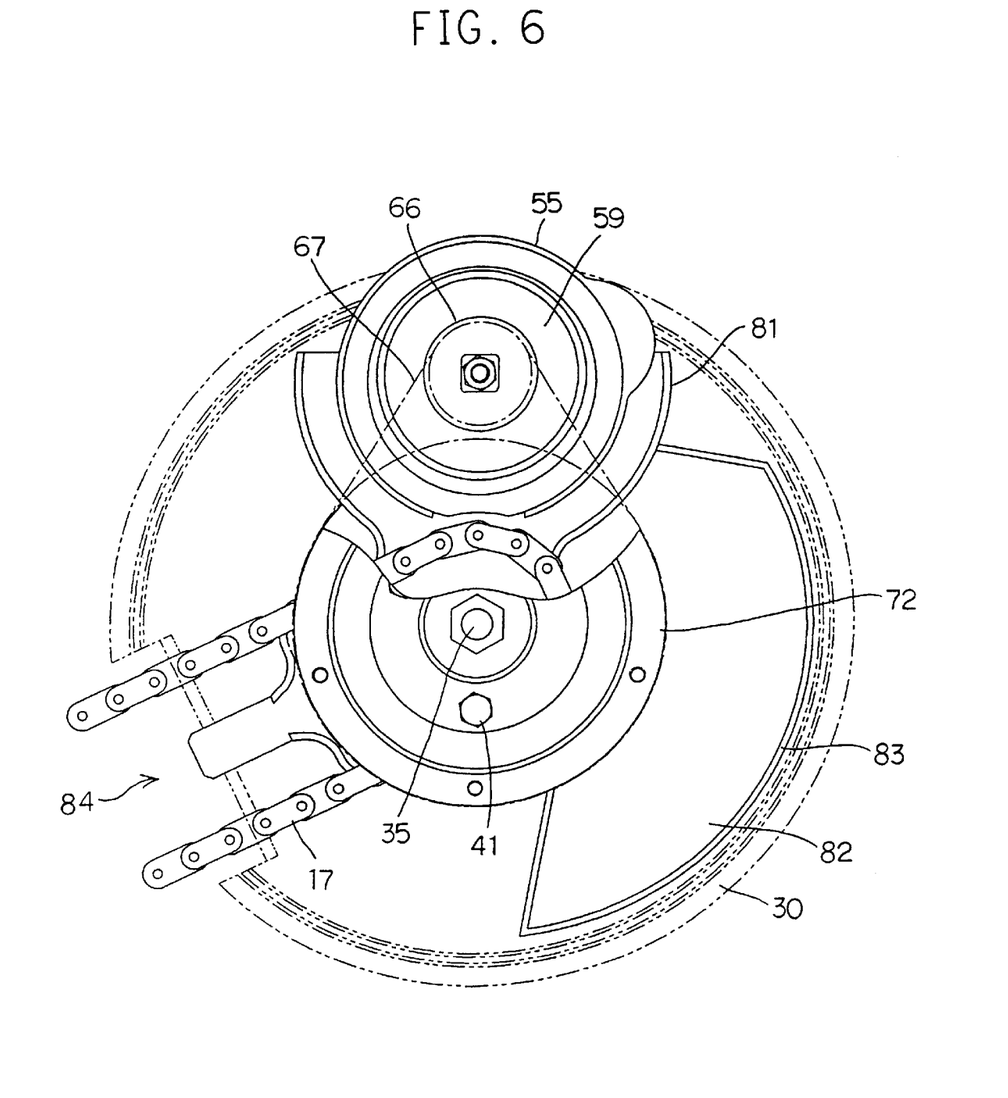
FIG. 6 is a plan configuration view seen from the inner side of the fixed casing according to an embodiment of the present invention.
Figure 7:
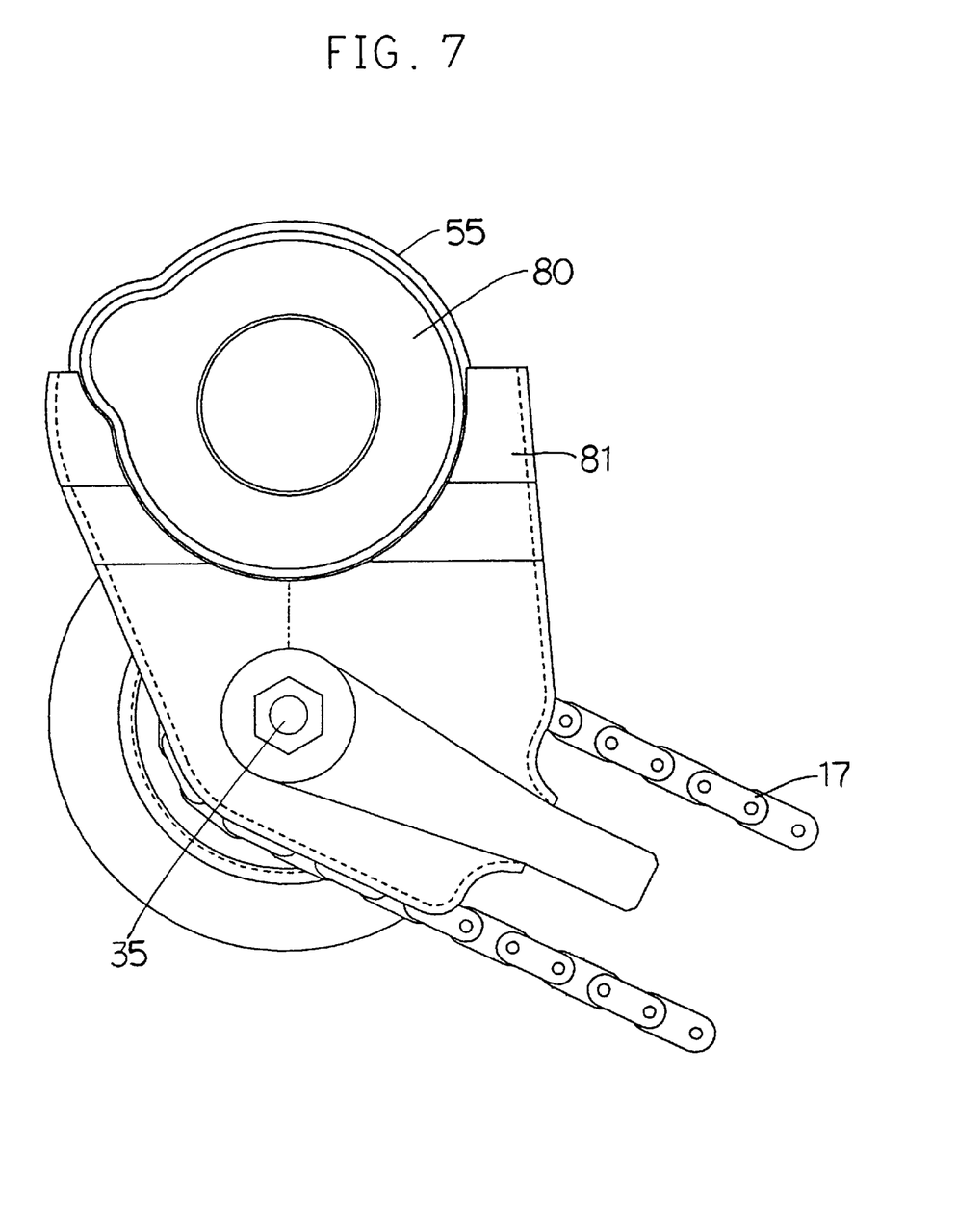
FIG. 7 is a plan view seen from the outside of the fixed casing according to an embodiment of the present invention.

The configuration of the driving portion 15 seen from the fixed casing 30 side will be described based on FIG. 6 and FIG. 7.

Numeral 80 is a cover made of resin for covering the motor 55, which is pressfitted into the fixed casing 30.

Numeral 81 is a metal hub plate which is provided inside the fixed casing 30 and is formed in a Y-shape so as to hold the motor 55 from below, and is mounted on the axle 35. The hub plate 81 is mounted on the axle 35 with the central open portion of the fixed casing 30 being externally projected. The hub plate 81 has an opening 84 to which the chain 17 faces, together with the fixed casing 30. The fixed casing 30 is separable to allow the chain 17 to be disengaged from or to be changed by separating and detaching the fixed casing 30, which can improve the assembly operation.

Numeral 82 is a control substrate which is accommodated in the rotational casing 31 for driving the motor 55, and is housed in a frame 83 made of resin.

Figure 5:
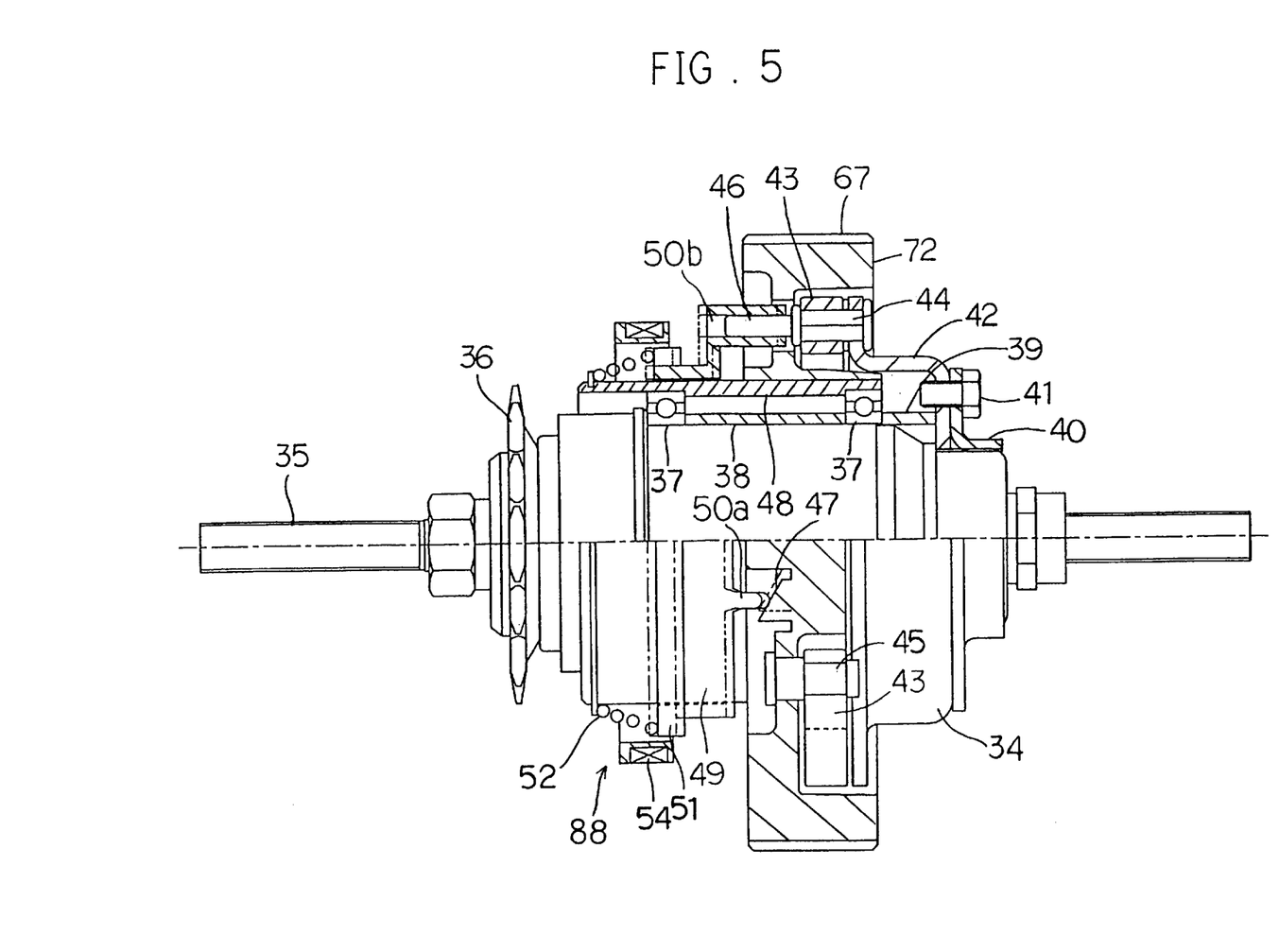
FIG. 5 is a side sectional view of a torque detection portion according to an embodiment of the present invention.

A torque detecting portion for detecting the man power driving force to be applied upon a pedal 5 will be described in detail based on FIG. 5.

A man power driving force to be applied when the pedal 5 has been stepped on is inputted into the rear sprocket 36 through the chain 17. After the speed has been changed by a change gear 34, distortion is caused in the washer spring 43. The magnitude of distortion shows a magnitude of man power driving force. The washer spring 43 rotates the final stage pulley 72 with a delay corresponding to a magnitude of distortion of the washer spring 43. Namely, a rotation operation is effected with a slip being caused between the container 38 and the final stage pulley 72. When the washer spring 43 is distorted, the inclining portion 47 is moved to a position of the two-dot chain line from the solid line. At this time, the convex portion 50a formed on the sliding member 49 is moved in the axle 35 direction corresponding to the movement of the inclining portion 47 due to the contact with the inclining portion 47. The sliding member 49 spirally moves from a position of the solid line to a position of the two-dot chain line against an urging force of the spring 52. Thus, the ring 51 also moves from a position of the solid line to a position of the two-dot chain line whereby inductance of the coil 54 can be changed. Namely, the magnitude of the man power driving force can be converted into electric signals. Since the washer spring 43 is restored to its original shape by the restoring force of the spring when the man power driving force is eliminated, the inclining portion 47 is restored to the original position, and the convex portion 50a in contact with the inclining portion 47 is restored to the original position by the restoring force of the spring 52. Thus, a condition where the man power driving force is not applied can be detected by the change in the inductance of the coil 54. The inclining portion 47, sliding member 49, ring 51, coil 54 and so on are called a torque detecting portion 88. In order to smoothly move the sliding member 49 in the direction of the axle 35, the concave portion 50b to be engaged with the extended portion 46 of the pin 44 is formed in the sliding member 49.

Figure 1:
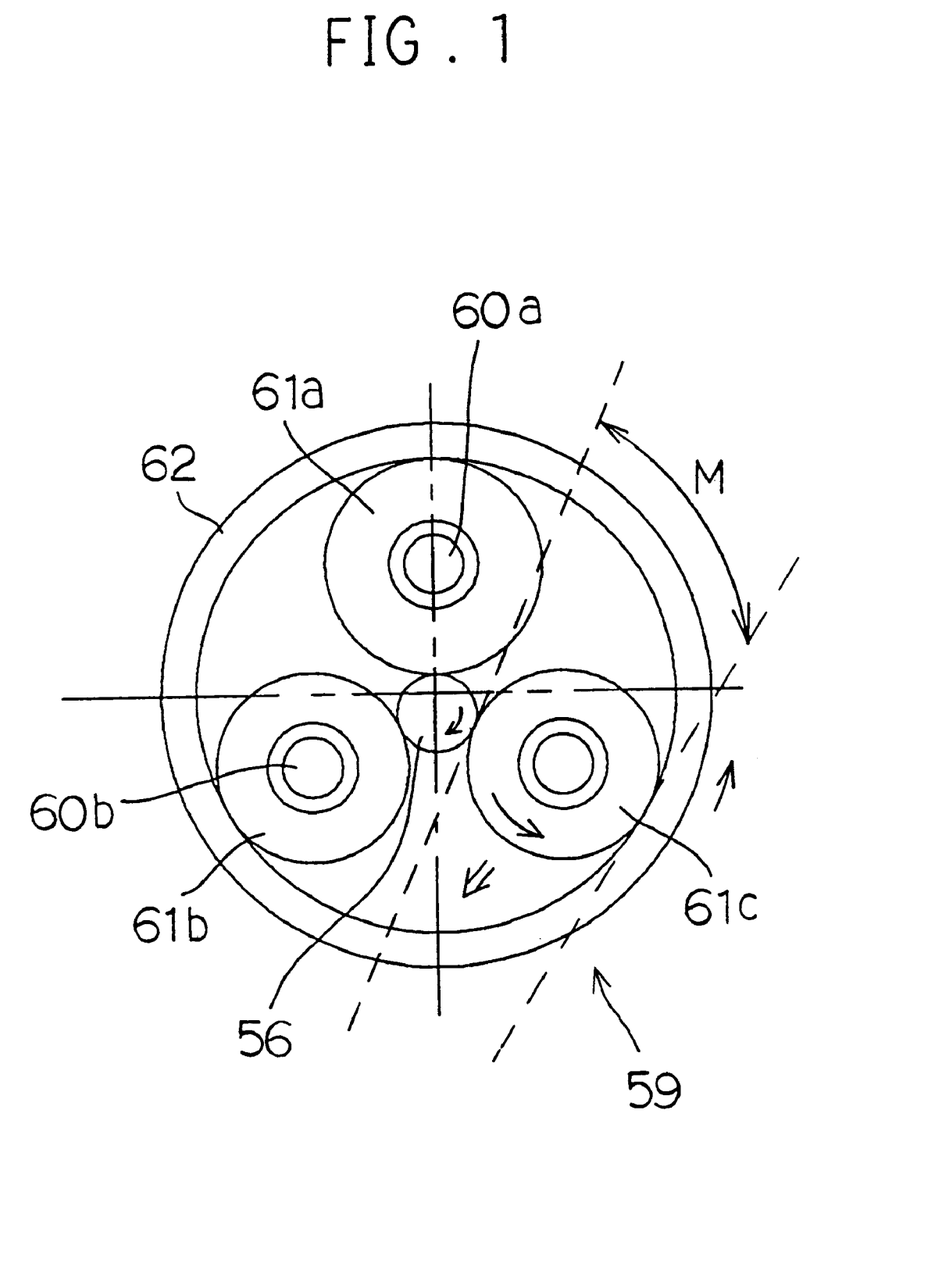
FIG. 1 is a sectional view of a main portion of an epicyclic roller reduction mechanism according to an embodiment of the present invention.

The configuration of rollers of the epicyclic roller reduction mechanism 59 will be described based on FIG. 1.

The roller 61 of the epicyclic roller reduction mechanism 59 is composed of a roller 61a, which is largest in diameter, rotating around a pin 60a, a roller 61b rotating around a pin 60b and having a diameter smaller than the roller 61a, and a roller 61c where a pin is not provided and having a diameter the same as that of the roller 61b. Three rollers are provided in pressure contact with the outer periphery of the rotary shaft 56 of the motor 55 and the inner periphery of the rotary cylinder 62. Since the roller 61c is not fixed in position by the pin, the roller 61c is movable within a space surrounded by the roller 61a, rotary shaft 56 and rotary cylinder 62. The roller 61c is in pressure contact with the rotary shaft 56 and the rotary cylinder 62 with the wedge angle M, and the position of the roller 61c shown in FIG. 1 is thrust most.

The epicyclic roller reduction mechanism 59 is configured in such a manner that the rotary shaft 56, i.e., the center of the input of the epicyclic roller reduction mechanism 59, and the output shaft 63 of the epicyclic roller reduction mechanism 59 might become eccentric, because the size of rollers 61 are different from one another as described above. Referring to FIG. 1, the center of the output shaft 63 is provided in a position where the one-dot chain lines are intersected. The epicyclic roller reduction mechanism 59 operates to transmit the power of the rotary shaft 56 to the output shaft 63 by moving the roller 61c in a direction of coming into contact between the rotary shaft 56 and the rotary cylinder 62 when the rotation of the rotary shaft 56 is faster than the rotation speed of the output shaft 63. When the rotation of the output shaft 63 is faster than the rotating speed of the rotary shaft 56, the pressure contact between the other rollers 61a, 61b and the rotary shaft 56 is removed by moving the roller 61c in a direction of coming out of contact between the roller 61c and the rotary shaft 56, whereby transmission of the driving force from the rotary shaft 56 is cut off. Namely, a clutch function of continuing and discontinuing the driving force by movement of the roller 61c is provided. In the present embodiment, the roller 61c corresponds to a clutch means.

The operation will be described hereinafter.

When the rotary shaft 56 is rotated in a direction indicated by the arrow, the roller 61c starts its rotational operation by the rotation, comes into pressure contact with the rotary cylinder 62 and the rotary shaft 56, and moves so that it is inserted in the angle of the wedge angle M. Thus, the other two rollers 61a and 61b also come into pressure contact with the rotary shaft 56 and start to rotate around the pins 60a and 60b, respectively. Three rollers 61 come into pressure contact with the rotary shaft 56, whereby the rotary cylinder 62 in contact with the outer periphery of the roller 61 starts its rotation in the arrow direction by the frictional force against the roller 61. This condition is continued in the case where the rotation speed of the rotary shaft 56 is faster than the rotation speed of the output shaft 63.

A case where the rotation speed of the rear wheel 11 is faster than the rotation speed of the motor 55 will be described. When the rotation speed of the rear wheel 11 becomes faster than the rotation speed of the motor 55 with the roller 61c being in pressure contact as shown in FIG. 1, the rotary cylinder 62 rotates faster than the rotating shaft 56. The roller 61c starts its movement in a direction of coming out of contact between the rotary shaft 56 and the rotary cylinder 62, because a pin which becomes the central shaft is not provided in the roller 61c. When the pressure contact between the rotary shaft 56 and the roller 61c is eliminated, the other rollers 61a and 61b have no pressure contact with the rotary shaft 56, so that the driving force from the motor 55 cannot be transmitted to the rotary cylinder 62. Thus, the movement of the roller 61c operates to cut off transmission of the driving force. Namely, the roller 61c acts as a one-way direction clutch. When the rear wheel 11 is rotated faster than the motor 55, the smooth running can be performed without the motor 55 becoming a load on the rotation of the rear wheel 11.

The configurations of the epicyclic roller reduction mechanism 59, motor 55 and pulley 66 will be described in detail based on FIG. 2.

Numeral 89 is a bearing provided in the epicyclic roller reduction mechanism 59 for engagement with the rotary shaft 56 of the motor 55. The rotary shaft 56 is engaged with the bearing 89 so that the rotary shaft 56 can be fixed to the epicyclic roller reduction mechanism 59 for enabling smooth rotation thereof. In this embodiment, the bearing is used as an input mechanism for inputting the rotary shaft 56. Any coupler which connects the rotary shaft 56 with the epicyclic roller reduction mechanism 59 can be employed.

Numeral 90 is a fixing member which is provided in two locations on the outer periphery of the cover 64 of the epicyclic roller reduction mechanism 59. The fixing member 90 is composed of a lock plate 91 to be held from above on the cover 64, and a screw 92 penetrating through the lock plate 91 and screwed into the housing of the motor 55. The cover 64 is prevented from turning with the fixing member 90.

Figure 3:
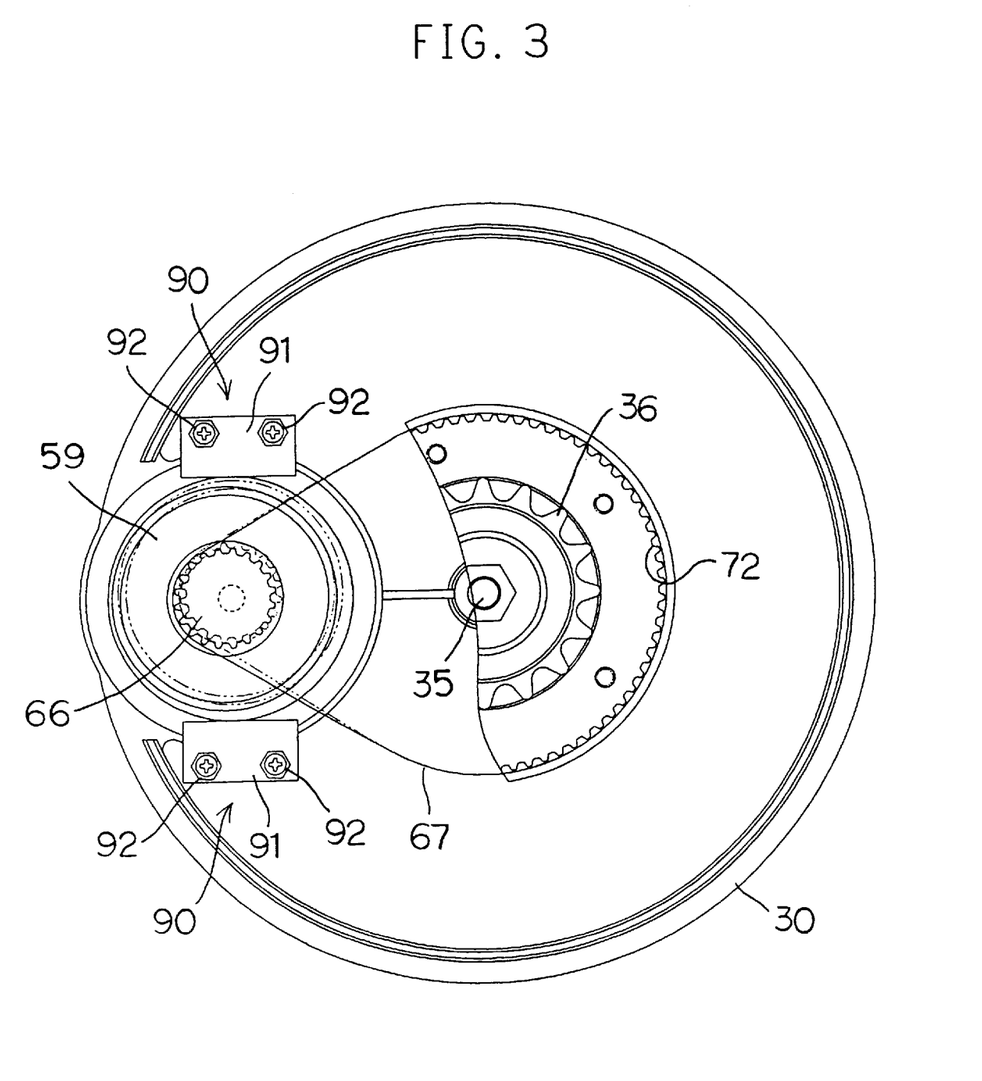
FIG. 3 is a side view of an epicyclic roller reduction mechanism according to an embodiment of the present invention.

The tensing operation of the belt 57 in assembly will be described under the above configuration based on FIG. 2 and FIG. 3.

When the epicyclic roller reduction mechanism 59 is mounted, the rotary shaft 56 is engaged with the bearing 89. The belt 67 is kept engaged with the pulley 72 before the cover 64 is fixed with the fixing member 90. Since the rotary shaft 56 of the motor 55 and the output shaft 63 provided in the cover 64 are eccentric in position at this time, the cover 64 is fixed with the fixing member 90 in a position where the belt 67 is pulled most, by moving the cover 64 while keeping the cover 64 around the rotary shaft 56 of the motor 55. This operation is shown by movement from a position in two-dot chain line to a position in solid line shown in FIG. 3, and the cover 64 is fixed with a fixing member 90 when the cover 64 has become a solid line position. The cover 64 is fixed by tightening the screw 92 penetrating through the lock plate 91 so that the belt 67 can be tensed without the need of a member such as tension pulley.

Figure 9:
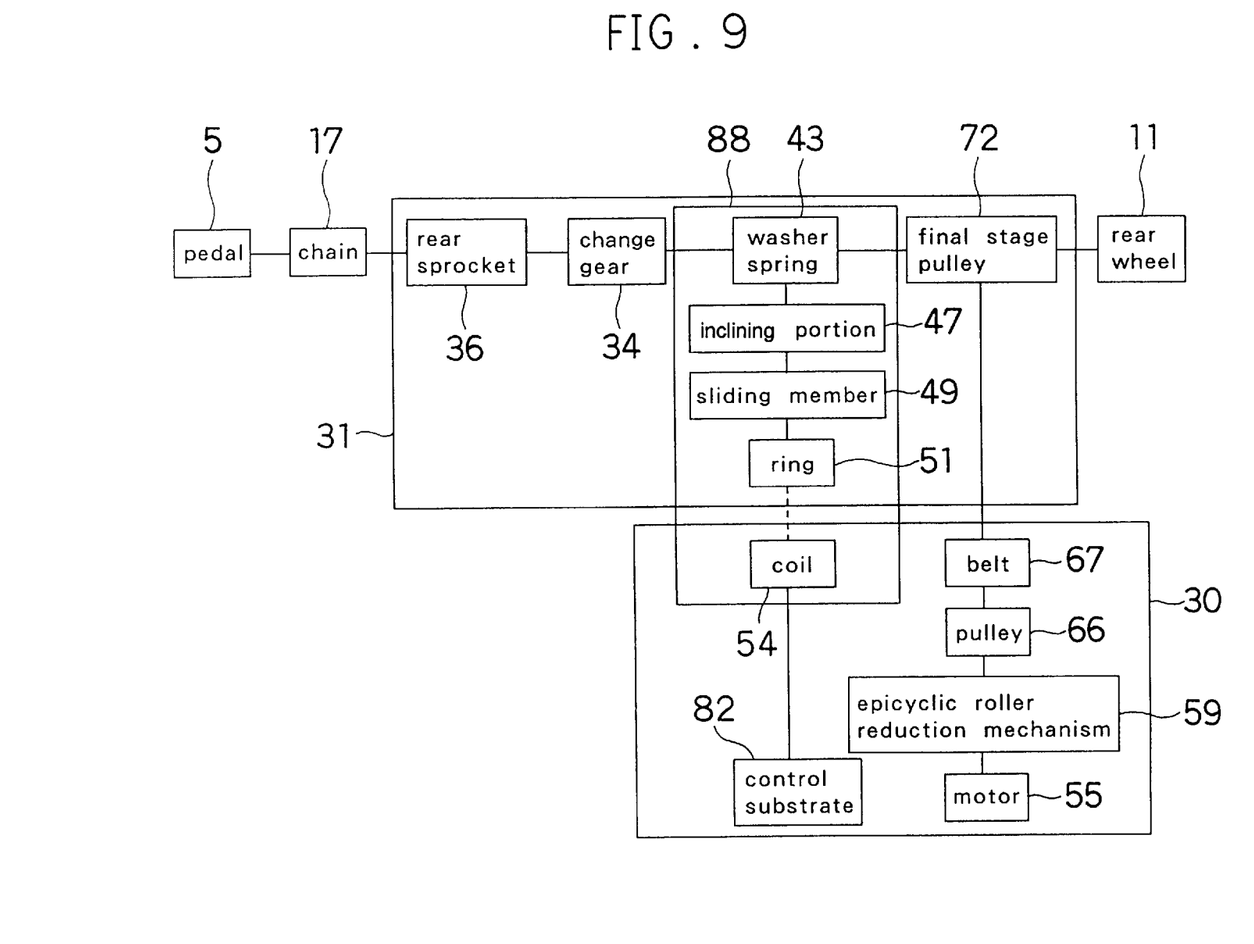
FIG. 9 is a power system diagram according to an embodiment of the present invention.

The power transmission in the above described constitution will be described based on FIG. 9.

In the man power driving system, the man power given by the pedal 5 is transmitted to the rear sprocket 36 with the chain 17 and the speed is changed with the change gear 34. Then, the man power distorts the washer spring 43 and is transmitted to the final stage pulley 72 to rotate the rotational casing 31.

In the motor driving system, the distortion of the above described washer spring 43 is detected by a torque detection portion 88 as a magnitude of the man power driving force, and is inputted into the control substrate 82 as a man power driving force signal by detecting the signal. The driving signal for the motor 55 is outputted to provide motor driving force of a magnitude corresponding to the signal of the inputted man power driving force, so as to drive the motor 55. The driving force outputted from the motor 55 is transmitted to the final stage pulley 72 through the epicyclic roller reduction mechanism 59, pulley 66, and belt 67, so as to drive the rear wheel 11 together with the man power driving force.

Although the belt 67 is provided on the pulley 72 in this embodiment to transmit the power, a gear, instead of the belting 67, can be provided to adjust the interlocking between gear and the gear.

Since a clutch means for transmitting only the one-way driving force is provided between the rotary shaft 56 and the output shaft 63 as described above, it can operate also as a reduction machine, thereby reducing the number of the components with an effect of lighter weight and more compact shape.

Since the epicyclic roller reduction mechanism 59 is used as a reduction machine, the reduction machine can be made compact. In addition, the roller 61c is a clutch, thus becoming lighter in weight and more compact in shape. One component can achieve two functions, thereby reducing the number of components and the cost.

When the power transmitting apparatus stated above is used for a motor-assisted bicycle, it can achieve a role of cutting off the power transmission between rotation of the driving wheel and the motor 55 when the rotation speed of the driving wheel is faster than the rotation speed of the motor 55, with an effect that the load in such a case is less, ensuring smooth running.

Since the motor-assisted bicycle of the present invention comprises a bearing 89 for inputting the rotary shaft 56 of the motor 55, a roller 61 coupled to the rotary shaft 56 for rotating, and a rotary cylinder 62 provided with an output shaft 63 coupled to the roller 61, and since the output shaft 63 is eccentric around the rotary shaft 56 of the motor 55 and a fixing member 90 for fixing the position of the rotary cylinder 62 is provided, the position of the member, such as belt 67 to be transmitted from the output shaft 63, can be adjusted. Namely, since the belt 67 can be fixed in a properly tensed condition, a transmission mechanism with a reduced mechanical loss can be provided, whereby the power can be transmitted with better efficiency.

The roller 61 comprises a plurality of cylindrical rollers 61 positioned in contact with the rotary shaft 56, and the rotary cylinder 62 is cylindrical and positioned to allow the outer peripheral surface of the roller 61 contact with the inner surface thereof, so that a more compact reduction mechanism can be provided.

Since the outer diameter of the roller 61 a, among a plurality of rollers 61, is larger than the outer diameters of the other rollers 61b and 61c, the rotary shaft 56 and the output shaft 63 can be positioned eccentrically so that the tension of the transmission mechanism such as belt 67 can be adjusted.

Since a pulley 72 for provision of a ring-shaped belt 67 is provided in the output shaft 63, sufficient speed reduction can be conducted with a compact constitution.

Since the output mechanism is composed of a rotary cylinder 62 and a cover 64 having a fixing member 90, the position of the output shaft 63 can be determined with a simple operation of fixing the cover 64 with a fixing member. Furthermore, since the rotary cylinder 62 is covered with the cover 64, safety can be ensured even during operation.

The motor-assisted bicycle of the present invention includes a power transmission device comprising a reduction mechanism for reducing the rotation speed of the rotary shaft of the motor, an output shaft coupled to the reduction mechanism and for outputting the driving force, a clutch means provided between the rotary shaft and the output shaft and for transmitting only one-direction driving force, the entire driving portion can be made compact by providing the clutch means within the reduction mechanism.

The reduction mechanism uses an epicyclic roller reduction mechanism having a plurality of rollers coupled to the rotary shaft, the outer diameter of at least one roller is different from the outer diameters of the other rollers and one of the rollers is not supported with the shaft in its center, so that the roller not supported with the shaft functions as a clutch depending on the rotating direction of the rotary shaft or the output shaft. Thus, the epicylic roller reduction mechanism can be provided with a clutching function with a light, compact and simple configuration.

The driving portion by the motor of the motor-assisted bicycle can be made smaller by provision of the clutching means within the epicyclic roller reduction mechanism, thus becoming lighter in weight and more compact in shape. The clutch mechanism can be provided with simpler construction.

The motor-assisted bicycle of the present invention includes a roller coupled to the rotary shaft and adapted to be rotated, and an output mechanism provided with an output shaft coupled to a portion except the coupling portion to the rotary shaft of the roller. The output shaft is eccentric around the rotary shaft, and the fixing member for fixing the position of the output mechanism is provided, so that the position of the output shaft can be adjusted eccentrically around the rotary shaft and the position to the transmission member provided in the output shaft can be adjusted. A transmission mechanism with less mechanical loss can be provided so that the power can be transmitted with better efficiency. Operationality can be improved, because the position can be adjusted with ease.

A reduction mechanism which is compact can be provided, since the roller comprises a plurality of cylindrical rollers positioned in contact with the rotary shaft, and the output mechanism is cylindrical and positioned in such a manner that the outer peripheral surface of the roller is in contact with the inner surface of the output mechanism.

Since the outer diameter of at least one of the rollers among a plurality of rollers is different from those of the other rollers, the position of the rotary shaft can be made eccentric to that of the output shaft, so that the output shaft and the member to be coupled to the output shaft can be easily adjusted.

Since a pulley for provision of the ring-shaped transmission member is provided in the output shaft, sufficient reduction can be conducted with a compact constitution.

Further, since the output mechanism is composed of a rotary cylinder and a cover having a fixing member, the position of the output shaft can be decided with a simple operation of fixing the cover with a fixing member. The rotary cylinder is covered with the cover, which offers a safety operation.

What is claimed is:

1. A motor-assisted bicycle comprising:

a transmission reduction mechanism operative to transmit rotation of a motor and to reduce speed;

a driving wheel driven by a driving force from the transmission reduction mechanism; and a clutch operative to transmit a one-way driving force, the clutch being provided as part of the transmission reduction mechanism, wherein the transmission reduction mechanism comprises an epicyclic roller reduction mechanism having a plurality of rollers, wherein at least one of the rollers has a different outer diameter than the other rollers and a center of at least one of the rollers is not supported with a shaft.

2. The motor-assisted bicycle of claim 1, wherein a rotary cylinder operative to be rotated in inner contact with an outer periphery of the roller is provided; and the roller not supported with a shaft is in inner contact between a rotary shaft and a rotary cylinder with respect to one-way rotation of the rotary shaft.

3. The motor-assisted bicycle of claim 1, wherein the motor-assisted bicycle includes a motor driving portion for rotating a driving wheel with the motor as a driving source, and a man power driving portion for rotating the driving wheel with man power as a driving source, and wherein the transmission reduction mechanism is interposed between the motor and the driving wheel.

4. The motor-assisted bicycle of claim 1, wherein the motor-assisted bicycle further comprises a hub of the driving wheel comprising a rotational casing rotated by the driving of the motor and a fixed casing operative to be fixed opposite the rotational casing, the motor and the transmission reduction mechanism being housed in the hub.

5. A motor-assisted bicycle comprising:

a transmission reduction mechanism comprising a roller coupled to a rotary shaft, an output mechanism having an output shaft coupled to a rotary cylinder coupled to said roller, wherein the output shaft is eccentric with the rotary shaft, and a fixing member for fixing a position of the output mechanism.

6. The motor-assisted bicycle of claim 5, wherein the roller comprises a plurality of rollers in contact with the rotary shaft, and the output mechanism, formed to be a cylinder having a bottom, is positioned to allow an outer periphery surface of the roller to contact an inner surface of the output mechanism.

7. The motor-assisted bicycle of claim 5, wherein the output shaft has a pulley operative to receive a ring-shaped transmission member.

8. The motor-assisted bicycle of claim 5 wherein the output mechanism comprises a rotary cylinder operative to be coupled to the roller, and a cover for covering the rotary cylinder and to be fixed with the fixing member.

9. The motor-assisted bicycle of claim 5, wherein the motor-assisted bicycle includes a motor driving portion for rotating a driving wheel with the motor as a driving source, and a man power driving portion for rotating the driving wheel with man power as the driving source, and wherein the transmission reduction mechanism is interposed between the motor and the driving wheel.

10. The motor-assisted bicycle of claim 5, wherein the motor-assisted bicycle includes a hub of the driving wheel composed of a rotational casing rotated by the driving of the motor and a fixed casing to be fixed oppositely to the rotational casing, the motor and the transmission mechanism being housed in the hub.

11. A vehicle comprising:

a motor capable of driving said vehicle;

a man power portion capable of transmitting man power delivered by a person to drive said vehicle;

a clutch operative to switch a driving source of said vehicle from said motor to said man power portion and from said man power portion to said motor, and an epicyclic roller device having a plurality of rollers supported by respective shafts and at least one roller not supported by a respective shaft and wherein all of said rollers are in contact with a rotary shaft of said motor when said driving source is said motor and wherein the roller not supported by said respective shaft is not in contact with said rotary shaft when said driving source is said man power portion.

12. The vehicle of claim 11 wherein said rotary shaft of said motor is eccentric with an output shaft and said output shaft is rotatably coupled with said rotary shaft by said epicyclic roller device.

* * * * *